United States Patent
Ross et al.

(10) Patent No.: US 11,681,606 B2
(45) Date of Patent: *Jun. 20, 2023

(54) AUTOMATIC CONFIGURATION OF LOGGING INFRASTRUCTURE FOR SOFTWARE DEPLOYMENTS USING SOURCE CODE

(71) Applicant: Palantir Technologies Inc., Denver, CO (US)

(72) Inventors: James Ross, San Francisco, CA (US); Robert Fink, Munich (DE)

(73) Assignee: Palantir Technologies, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,742

(22) Filed: Apr. 29, 2022

(65) Prior Publication Data
US 2022/0253369 A1    Aug. 11, 2022

Related U.S. Application Data

(63) Continuation of application No. 16/670,839, filed on Oct. 31, 2019, now Pat. No. 11,341,024.

(60) Provisional application No. 62/897,474, filed on Sep. 9, 2019.

(51) Int. Cl.
*G06F 9/44* (2018.01)
*G06F 11/34* (2006.01)
*G06F 16/901* (2019.01)
*G06F 8/41* (2018.01)

(52) U.S. Cl.
CPC .......... *G06F 11/3476* (2013.01); *G06F 8/427* (2013.01); *G06F 16/9027* (2019.01)

(58) Field of Classification Search
None
See application file for complete search history.

(56) References Cited

U.S. PATENT DOCUMENTS

| | | | |
|---|---|---|---|
| 9,619,478 B1 * | 4/2017 | Singh | G06F 11/3476 |
| 10,235,372 B1 * | 3/2019 | Kesarwani | G06F 8/61 |
| 2016/0098342 A1 * | 4/2016 | Faizanullah | G06F 8/443 717/131 |
| 2021/0149905 A1 * | 5/2021 | Luo | G06F 16/2272 |

OTHER PUBLICATIONS

Extended European Search Report for European Application No. EP20173279.9, dated Nov. 17, 2020, 8 pages.

(Continued)

*Primary Examiner* — Qamrun Nahar
(74) *Attorney, Agent, or Firm* — Lowenstein Sandler LLP

(57) ABSTRACT

One or more processors examine source code of one or more software packages that produce output messages and identify, in the source code, one or more call expressions that each represent a logging call. The one or more processors generate a number of search patterns for parsing output messages produced by the one or more software packages, wherein each of the search patterns is based on one or more arguments of a corresponding call expression of the one or more call expressions. The one or more processors further reduce the number of search patterns to be applied to the output messages produced by the one or more software packages to identify log entries among the output messages.

20 Claims, 6 Drawing Sheets

(56) References Cited

OTHER PUBLICATIONS

Wei, Xu et al., "Detecting Large-Scale System Problems by Mining Console Logs", Proceedings of the ACM Sigops 22nd Symposium on Operating Systems Principles, SOSP '09, Jan. 1, 2009 (Jan. 1, 2009), pp. 117-131, XP0552454995, New York, New York, USA, DOI: 10.1145/1629575.1629587, ISBN: 978-1-60558-752-3.

* cited by examiner

AUTOMATIC CONFIGURATION OF LOGGING INFRASTRUCTURE FOR SOFTWARE DEPLOYMENTS USING SOURCE CODE

RELATED APPLICATIONS

This application in a continuation of U.S. patent application Ser. No. 16/670,839, filed Oct. 31, 2019, which claims the benefit of U.S. Provisional Application No. 62/897,474, filed Sep. 9, 2019, the entire contents of each of which are hereby incorporated by reference herein.

TECHNICAL FIELD

This disclosure relates to the field of data aggregation and analysis systems, and in particular to automatic configuration of logging infrastructure for software deployments using source code.

BACKGROUND

Modern data centers often comprise thousands of hosts that operate collectively to service requests from even larger numbers of remote clients. During operation, components of these data centers can produce significant volumes of machine-generated data, including log entries output by various software deployments executing on those hosts. There is a need for a more automated way to identify and process these log entries through a centralized debugging pipeline.

BRIEF DESCRIPTION OF THE DRAWINGS

The present disclosure will be understood more fully from the detailed description given below and from the accompanying drawings of various embodiments thereof, which, however, should not be taken to limit the present disclosure to the specific embodiments, but are for explanation and understanding only.

DETAILED DESCRIPTION

Figure 1:
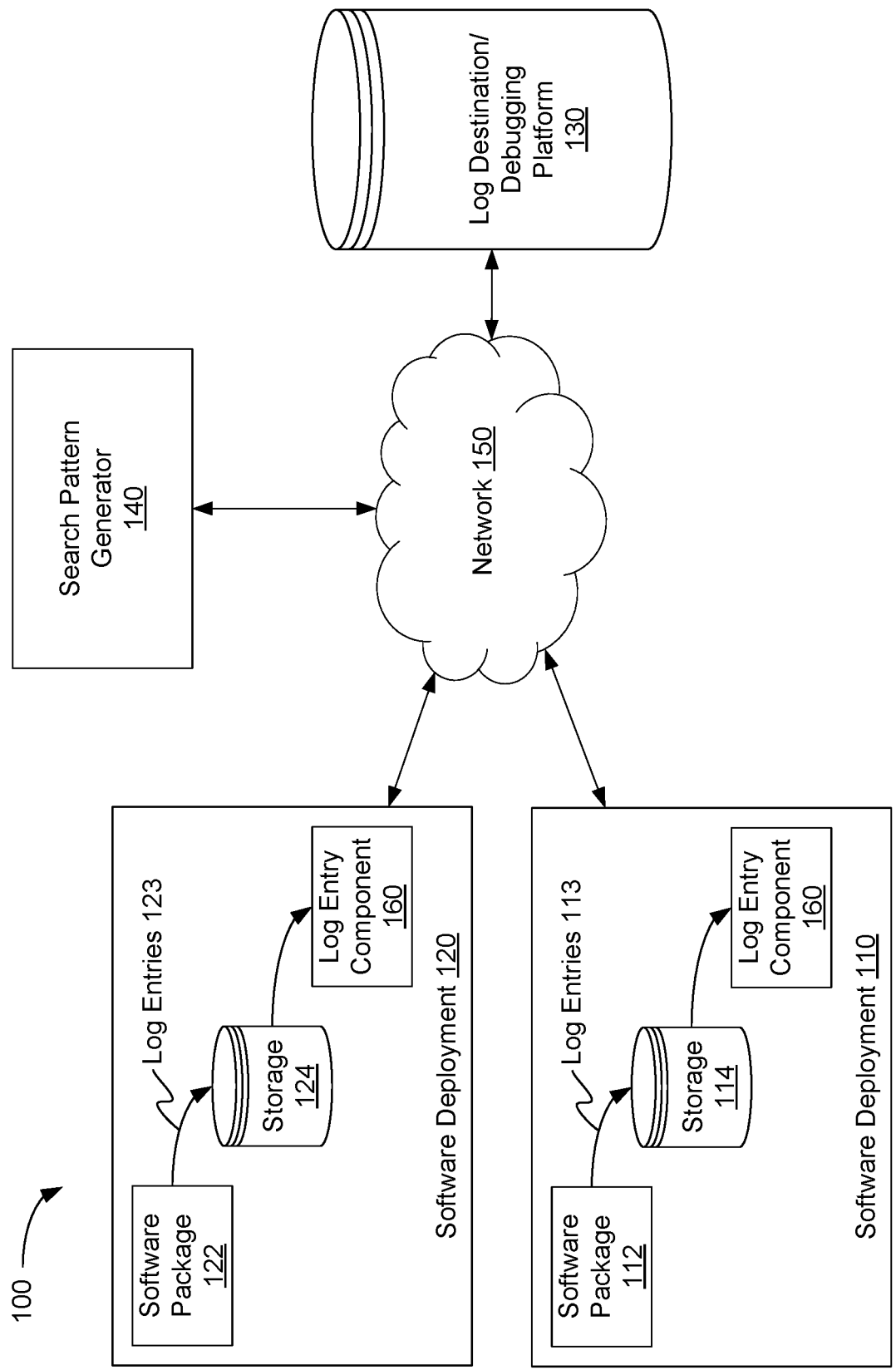
FIG. 1 is a block diagram illustrating a logging infrastructure for software deployments in which an automatic search pattern generator may operate, according to an embodiment.

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Aspects of the present disclosure are directed to automatic configuration of logging infrastructure for software deployments using source code. Any organization having multiple software deployments running at different locations can benefit from remote software debugging. By collecting log, telemetry and metric information from the distributed software deployments and consolidating that data to a central destination, developers can more efficiently debug or otherwise investigate issues occurring in the software. To accomplish this goal, the organization may implement a particular logging infrastructure. For example, each software deployment may include a daemon or other process that captures log data from the software and returns it to the central destination. This daemon may be configured to recognize log data having a specific structured format. The daemon may examine an output message from the software, compare the message to the expected format, and if there is a match, determine that the message is a log entry to be retrieved and returned to the central destination. The structured format of these log entries allows for more complex aggregation queries to be executed on specific fields of the log entry, thereby improving debugging capabilities.

In practice, however, not all software deployments will produce log entries in the specific structured format, causing the log entries from this software to be dropped and not returned to the central destination for debugging. Certain solutions have attempted to address this concern through manual creation of translation functions that convert the unstructured log entries to the specific structured format expected by the daemon. For example, the translation function can use a regular expression, or other search patterns, to identify messages that could be log entries and then reformat those messages into the structured format. Handcrafting usable regular expressions is difficult when the number of messages to be evaluated is high, however. The manually generated regular expressions are often overly general, resulting in the identification of log entries having parameters contained within the messages, rather than separated into a designated field. This ends up impacting the speed and accuracy of debugging the identified log entries.

Aspects of the present disclosure address the above and other deficiencies by providing a tool for programmatically generating configuration data for the logging infrastructure applied to various software deployments. In one embodiment, the tool examines source code of the software deployment generating log data and identifies call expressions in the source code that represent logging calls. Based on the arguments of the call expressions, the tool can construct search patterns, which, when applied to output messages generated by the call expressions, will recognize the output messages as log entries. A search pattern refers to a sequence of characters that can be used by a parser or any other string searching function to find possible variations of a particular expression and to optionally replace each of those variations with that particular expression. One example of a search pattern is a regular expression or regex. According to some aspects of the present disclosure, the constructed search patterns can be used to configure the logging infrastructure to recognize the corresponding log entries when evaluating messages output by the same or a different software deployment in the future.

When the logging infrastructure is being used to evaluate messages of a software deployment, a given message is compared against each of the constructed search patterns in an ordered list until a match is found. Thus, it is advantageous to have the constructed search patterns most likely to recognize a message as a log entry be positioned at the beginning of the ordered list. To achieve this ordering, the logging infrastructure can maintain a mapping of the various constructed search patterns to the number of messages recognized as log entries by each constructed search pattern over time. As additional messages are recognized as log entries based on a given constructed search pattern, a corresponding counter for that constructed search pattern is incremented. Accordingly, the ordered list can be configured such that the constructed search patterns having the highest number of historical recognized occurrences are positioned at the beginning of the ordered list. In one embodiment, the ordered list includes a threshold number of constructed search patterns. Thus, if more than the threshold number of constructed search patterns is identified, the number of constructed search patterns is reduced to satisfy the threshold. For example, multiple regular expressions that have a certain level of similarity (i.e., a certain overlap in the output messages that were recognized as log entries resulted from the use of each regular expression) can be combined into a single more general regular expression, or the regular expressions having the lowest number of historical recognized occurrences can be dropped from the configuration of the logging infrastructure so that the threshold number of regular expressions is satisfied.

Accordingly, the technology described herein allows for automatic recognition and formatting of log entries from software deployments that are not configured to output log data in the specific structured format. Thus, an existing logging infrastructure can be used to manage those log entries and allow for debugging of the corresponding software deployments. As a result of being automatically generated from an examination of the actual logging call expressions in the source code of the software deployments, the accuracy and effectiveness of the search patterns automatically constructed using this technology is significantly higher than search patterns defined manually based only on the observed output messages of the software. This technology further allows for configuration of the logging infrastructure to recognize similar unstructured or unknowingly formatted log entries generated by other software distributions.

FIG. 1 is a block diagram illustrating a logging infrastructure for software deployments in which an automatic search pattern generator may operate, according to an embodiment. The logging infrastructure 100 can include one or more software deployment systems, such as software deployments 110 and 120, a log destination and debugging platform 130, and a search pattern generator 140, which can be in data communication with each other via network 150. Computer system 600 illustrated in FIG. 6 may be one example of any of client device, sever device, or other computing device used to implement or execute any of software deployments 110 and 120, log destination and debugging platform 130, and/or search pattern generator 140 in the logging infrastructure 100. The network 150 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing devices used to implement or execute software deployments 110 and 120, log destination and debugging platform 130, and/or search pattern generator 140 may include processor-based systems such as computer systems. Such computer systems may be embodied in the form of desktop computers, laptop computers, personal digital assistants, cellular telephones, smartphones, set-top boxes, music players, web pads, tablet computer systems, game consoles, electronic book readers, or other devices with similar capability. In addition, these computing devices may include, for example, a server computer or any other system providing computing capability. Alternatively, the logging infrastructure 100 may employ a plurality of computing devices that may be arranged, for example, in one or more server banks or computer banks or other arrangements. Such computing devices may be positioned in a single location or may be distributed among many different geographical locations. For example, logging infrastructure 100 may include a plurality of computing devices that together may comprise a hosted computing resource, a grid computing resource and/or any other distributed computing arrangement. In some cases, logging infrastructure 100 may correspond to an elastic computing resource where the allotted capacity of processing, network, storage, or other computing-related resources may vary over time.

In one embodiment, software deployment 110 includes an executable software package 112 and software deployment 120 includes an executable software package 122. The software packages 112 and 122 may each be represented by source code including instructions which can be executed by a processing device to perform designated functions or tasks. The software packages 112 and 122 can each include either a single file or multiple files. Depending on the embodiment, the software packages 112 and 122 can be either the same or different software packages (i.e., designed to perform separate functions or tasks). The source code of either of software packages 112 and 122 can include, for example, a number of call expressions (i.e., expressions that involve a function call). A call expression can invoke a function and evaluate the function's return value. Certain call expressions in the source code can be referred to as logging calls. A logging call is a call expression where the associated function is designated to output a log entry including certain parameters. During execution, the software packages 112 and 122 may periodically output log entries, such as in response to the occurrence of particular actions or events. The parameters and other information contained within the log entries may be useful to developers when debugging the software packages 112 and 122 at a later point in time. The log entries may be provided as output messages by the software packages, potentially along with other output messages that do not include logging calls.

Accordingly, the logging infrastructure 100 may be designed to recognize and capture these logging calls and return them to log destination and debugging platform 130. Log destination and debugging platform 130 may represent a central destination or repository where logging infrastructure 100 can consolidate log, telemetry, and metric information from multiple distributed software deployments, such as those including software packages 112 and 122. Depending on the embodiment, log destination and debugging platform 130 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. Having the logging data consolidated to a single destination allows developers to more efficiently debug or otherwise investigate issues occurring during the execution of software packages 112 and 122 by eliminating other variables that may be attributable to the corresponding software deployments 110 and 120. In one embodiment, the output messages from software package 112 are maintained in local storage 114 in software deployment 110 and the output messages from software package 122 are maintained in local storage 124 in software deployment 120. Each software deployment may include an instance of a log entry component 160, which may be a daemon or other program that reads the output messages from the corresponding local storage, identifies the log entries from the logging calls and sends the log entries to log destination and debugging platform 130.

Different software packages may generate log entries having different formats. For example, software package 122 may generate log entries 123 (unstructured entries and/or entities that have an unknown format), which are not arranged in the specific structured format expected by log entry component 160. Thus, the log entries 123 may not be recognized by log entry component 160 and may not be returned to log destination and debugging platform 130 unless log entry component 160 is specifically configured to recognize the log entries 123.

Accordingly, search pattern generator 140 can programmatically generate configuration data, including specific search patterns, for log entry component 160 to apply to various software deployments. In one embodiment, search pattern generator 140 is executed by a processing device of a separate computing system connected to network 150. In another embodiment, search pattern generator 140 may be executed on the same computing system as log destination and debugging platform 130 or as one or more of the software deployments 110 and 120. In one embodiment, search pattern generator 140 examines the source code of software package 122 and identifies call expressions in the source code that represent logging calls. Based on the arguments of the call expressions, search pattern generator 140 can automatically construct a search pattern, such as a regular expression, which, when applied to an output message generated by the call expression, will recognize the output message as a log entry. The regular expressions or other search patterns can be used to configure components of the logging infrastructure 100, such as log entry component 160, to recognize the corresponding log entry when evaluating messages output by software package 122 in the future. In addition, log entry component 160 can use the search patterns generated based on the source code of software package 122 to recognize log entries in output messages generated by a different software package or in a different software deployment.

Figure 2:
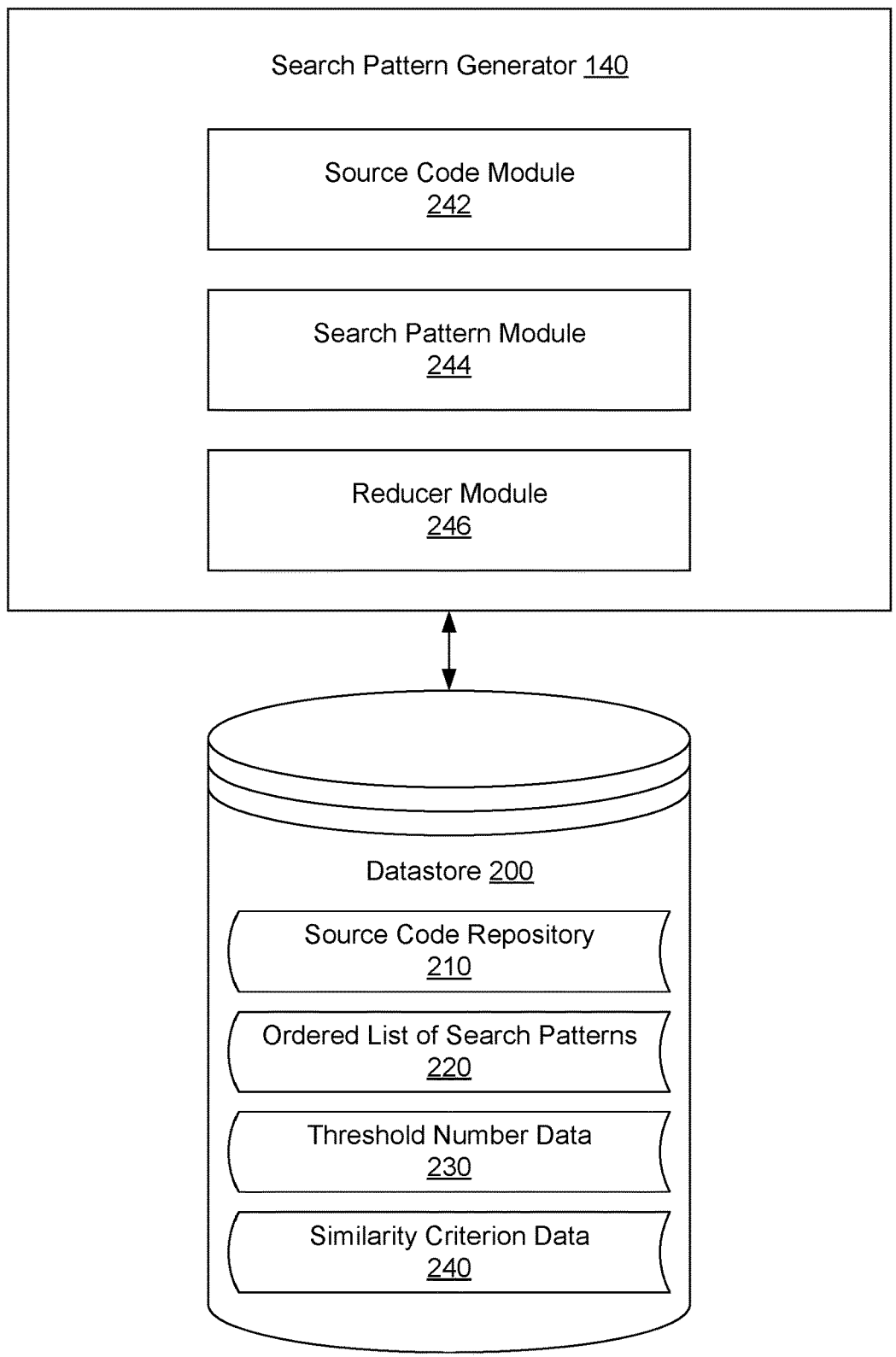
FIG. 2 is a block diagram illustrating a search pattern generator, according to an embodiment.

FIG. 2 is a block diagram illustrating search pattern generator 140, according to an embodiment. Search pattern generator 140 may include platform source code module 242, search pattern module 244, and reducer module 246. This arrangement of modules and components may be a logical separation, and in other embodiments, these modules or other components can be combined together or separated in further components, according to a particular embodiment.

In one embodiment, datastore 200 is connected to search pattern generator 140 and includes source code repository 210, an ordered list of search patterns 220, threshold number data 230, and similarity criterion data 240. In one embodiment, a single computer system may include both search pattern generator 140 and datastore 200. In another embodiment, datastore 200 may be external to the computer system and may be connected to search pattern generator 140 over a network or other connection. In other embodiments, search pattern generator 140 may include different and/or additional components which are not shown here to simplify the description. Datastore 200 may include a file system, database or other data management layer resident on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, source code module 242 examines the source code of a software package, such as software package 122, and identifies one or more call expressions in the source code that represent logging calls. Source code module 242 may access the source code from a known storage location, such as source code repository 210 in datastore 200, for example. In other embodiments, the source code of software package 122 may be accessible to source code module 242 from some other location, such as within the corresponding software deployment 120. In one embodiment, source code module 242 is directed to the source code of a particular software package by an administrator or other user who indicates that the corresponding software package generates output messages including log entries in an unknown format that are to be recognized. In another embodiment, source code module 242 can automatically recognize the source code of one or more software packages in a given location or set of locations, such as source code repository 210.

Upon identifying a software package 122 to examine, source code module 242 can identify one or more call expressions in the source code that represent logging calls. In one embodiment, the administrator or other user manually identifies those call expressions in the source code that represent logging calls and provides an indication of those call expressions to source code module 242. In another embodiment, source code module 242 identifies each of one or more files in the software package 122, and traverses a corresponding abstract syntax tree of each file to automatically identify those call expressions that represent logging calls. In one embodiment, source code module 242 is a parser that takes input data (i.e., the source code) and builds a data structure (e.g., the abstract syntax tree) giving a structural representation of that input data and showing the relation of the constituents of the input data to one another. The abstract syntax tree is a tree representation of the abstract syntactic structure of the source code and includes a number of nodes. Each of the nodes can represent a construct occurring in the source code. In certain programming languages, such as Golang (Go) among others, for example, each of the nodes has a concrete type. Untyped programming languages, while still having an abstract syntax tree, may not include nodes of a concrete type, however. Thus, all method invocations in a program written in a language with concrete types would be specifically denoted in the abstract syntax tree (e.g., *ast.CallExpr where CallExpr is short for call expression). Accordingly, when traversing the abstract syntax tree and determining the type of each node, source code module 242 can identify those nodes that represent a call expression. For those nodes that represent a call expression, source code module 242 can further examine the specific arguments of the call expression to determine whether the call expression represents a logging call. A logging call is a call expression where the associated function is designated to output a log entry including certain parameters. Taking advantage of knowing what arguments these logging call expressions accept (e.g., in Golang the arguments may be the same as the standard library's fmt-.Printf method), source code module 242 can identify the call expressions as logging calls. Two examples of logging call expressions are as follows:

plog.Printf("finished scheduled compaction at % d (took % v)", compactMainRev, time.Since(totalStart))

plog.Warningf("% s request % q with result % q took too long (% v) to execute", prefix, reqStringer.String( ), result, d)

Thus, source code module 242 can look for the call expressions or method invocations that match "plog.Printf" or "plog.Warningf," as these are indicative of logging calls. In one embodiment, source code module 242 can repeat the above process for each node in the abstract syntax tree of each file in each software package of source code repository 210 and pass an indication of the call expressions identified as logging calls to search pattern module 244.

In one embodiment, based on the arguments of the call expressions identified as logging calls, search pattern module 244 can automatically construct a search pattern, which, when applied to an output message generated by the call expression, will recognize the output message as a log entry. The search pattern can be used to configure components of the logging infrastructure 100, such as log entry component 160, to recognize the corresponding log entry (and optionally modify the corresponding log entry to have a particular format) when evaluating messages output by software package 122 or any other software package in the future. In one embodiment, the arguments of a call expression are provided to search pattern module 244, which can generate an appropriate search pattern. In one embodiment, the call expression is represented by a string (see example above). Search pattern module 244 can apply string parsing logic to the string representing a corresponding call expression to identify a function call and one or more parameters in the arguments of the corresponding call expression. Search pattern module 244 can thus generate a search pattern that looks for static portions of the string and variable parameter values separately. The resulting search pattern can then match the string, despite changes to the particular parameter values that may be present in the corresponding output message.

In one embodiment, the search pattern is a regular expression ("regex"). The regular expression may include a sequence of characters that define a search pattern and can be used to parse a message to determine whether the search pattern is present in the message. A regular expression may include both literal characters having a specific meaning and metacharacters having a special meaning. For example, the metacharacter "." can represent every character except a new line. Together, the literal characters and metacharacters in the regular expression can be used to identify (i.e., match) text in a given pattern. In other embodiments, some other search pattern or information extraction methods could be used, such as parsing methods. For example, an LR parser is one type of bottom-up parser that efficiently reads context-free text, and is often used for processing of computer languages. LR parsers are deterministic and will produce a single correct parse without guesswork or backtracking, in linear time. These are merely some examples, and in other embodiments, search pattern module 244 may use different search methods that utilize various types of search patterns.

In one embodiment, search pattern module 244 maintains the generated search patterns in an ordered list 220. The search patterns may be arranged in the ordered list according to a number of output messages that each search pattern has previously matched (e.g., recognized as log entries). When the logging infrastructure is being used to evaluate messages of a software deployment, a given message is compared against each of the constructed search patterns in the ordered list 220 until a match is found. Thus, it is advantageous to have the search patterns most likely to match a log entry be positioned at the beginning of the ordered list 220. To achieve this ordering, search pattern module 244 can maintain a mapping of the various constructed search patterns to the number of log entries that each matches over time. As additional matches for a given search pattern are discovered, search pattern module 244 increments a corresponding counter for that search pattern. Accordingly, the ordered list 220 can be configured such that the search patterns having the highest number of historical matches are positioned at the beginning of the ordered list 220 and the search patterns having the lowest number of historical matches are positions at the end of the ordered list 220. In one embodiment, a separate module (not shown) can maintain the ordered list 220 and perform the other functions described above. This separate module may be another module within search pattern generator 140 or may be a separate component which has access to the output of source code module 242.

In one embodiment, reducer module 246 reduces the number of search patterns from the ordered list 220 prior to log entry component 160 being configured to apply those search patterns to the output messages produced by the one or more software packages to identify log entries among the output messages generated by those software packages. In one embodiment, reducer module 246 determines a number of search patterns in the ordered list 220 and compares the number of search patterns to a threshold number specified in threshold number data 230. If the number of search patterns in the ordered list 220 is greater than the threshold number, reducer module 236 may remove the search patterns outside the threshold number. Since the search patterns are arranged in an order according to a number of output messages that each search pattern has matched, the search patterns among the threshold number will necessarily have a higher number of matching output messages than the search pattern outside the threshold number. Thus, those search patterns outside the threshold number that are removed will be those having the lowest number of matching output messages from the ordered list 220. For example, if there are 572 search patterns in the ordered list 220 and the threshold number specified in threshold number data 230 is 500 search patterns, reducer module 246 can remove the last 72 search patterns from the ordered list 220. In one embodiment, the threshold number specified in threshold number data is a practical limit imposed by the query latency associated with comparing output messages to each of the search patterns in the list and is set to ensure that the entire process of recognizing a log entry among the output messages does not take longer than is acceptable.

Figure 3:
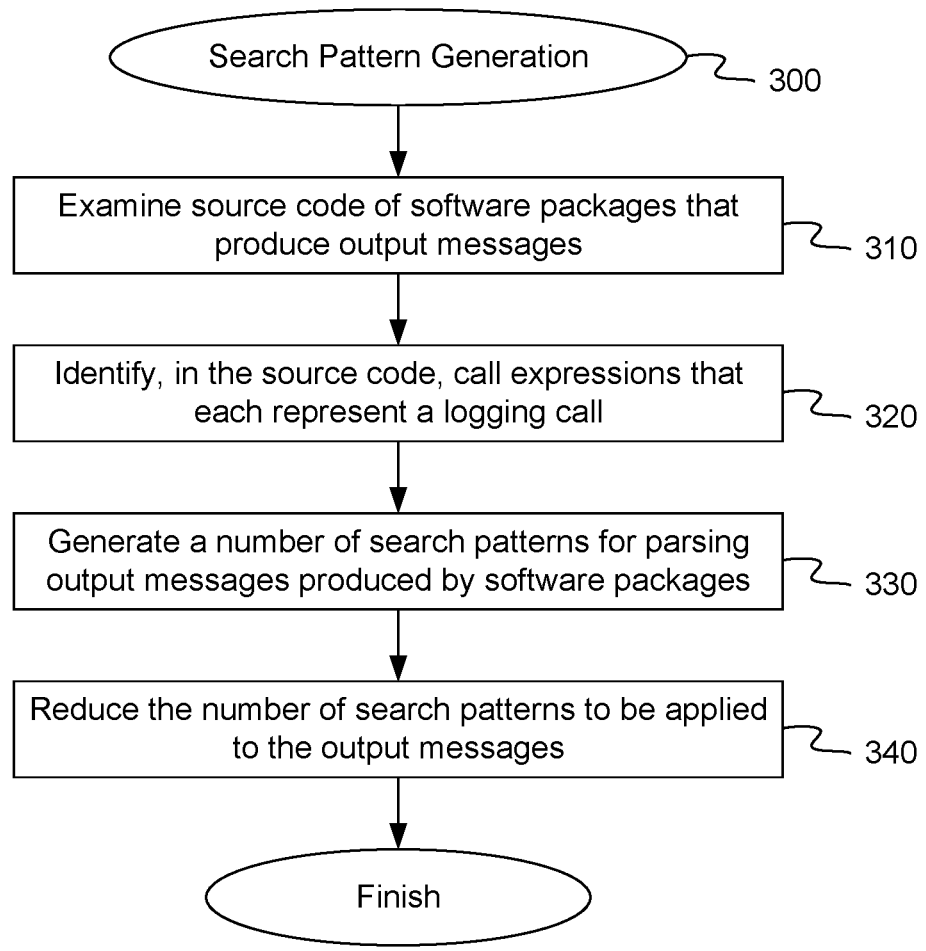
FIG. 3 is a flow diagram illustrating a method of generating search patterns to identify log entries using the source code of a software package, according to an embodiment.

FIG. 3 is a flow diagram illustrating a method of generating search patterns to identify log entries using the source code of a software package, according to an embodiment. The method 300 may be performed by processing logic that comprises hardware (e.g., circuitry, dedicated logic, programmable logic, microcode, etc.), software (e.g., instructions run on a processor to perform hardware simulation), or a combination thereof. In one embodiment, method 300 may be performed by search pattern generator 140, as shown in FIGS. 1 and 2.

Referring to FIG. 3, at block 310, method 300 examines source code of one or more software packages that produce output messages. For example, software package 122 may be represented by source code including instructions which can be executed by a processing device to perform designated functions or tasks. As part of its operation, software package 122 may generate a number of output messages in response to certain call expressions defined in the corresponding source code. In one embodiment, the source code of software package 122 is maintained in source code repository 210.

At block 320, method 300 identifies, in the source code, one or more call expressions that each represent a logging call. In one embodiment, source code module 242 identifies each of one or more files in the software package 122, and traverses a corresponding abstract syntax tree of each file. Each of the nodes in the abstract syntax tree can represent a construct occurring in the source code and can have an associated type. Thus, when traversing the abstract syntax tree and determining the type of each node, source code module 242 can identify those nodes that represent a call expression. For those nodes that represent a call expression, source code module 242 can further examine the specific arguments of the call expression to determine whether the call expression represents a logging call. A logging call is a call expression where the associated function is designated to output a log entry including certain parameters. Source code module 242 can look for the specific arguments that match known logging calls. In one embodiment, source code module 242 can repeat the above process for each node in the abstract syntax tree of each file in each software package of source code repository 210 and pass an indication of the call expressions identified as logging calls to search pattern module 244.

At block 330, method 300 generates a number of search patterns for parsing output messages produced by the one or more software packages, wherein each of the search patterns is based on one or more arguments of a corresponding call expression of the one or more call expressions. In one embodiment, search pattern module 244 can automatically construct a search pattern, which, when applied to an output message generated by the call expression, will recognize the output message as a log entry. The search pattern can be used to configure components of the logging infrastructure 100, such as log entry component 160, to recognize the corresponding log entry when evaluating messages output by software package 122 or any other software package in the future and to optionally modify the corresponding log entry to conform to a particular format (e.g., a predefined format that should be uniform for all log entries sent to the log destination and debugging platform 130). In one embodiment, the call expression is represented by a string and search pattern module 244 can apply string parsing logic to the string representing a corresponding call expression to identify a function call and one or more parameters in the arguments of the corresponding call expression. Search pattern module 244 can thus generate a search pattern that looks for static portions of the string and variable parameter values separately. The resulting search pattern can then be used to recognize a matching string, despite changes to the particular parameter values that may be present in the corresponding output message.

At block 340, method 300 reduces the number of search patterns to be applied to the output messages produced by the one or more software packages to identify log entries among the output messages. In one embodiment, reducer module 246 reduces the number of search patterns from the ordered list 220. For example, reducer module 246 can either remove a number of identified search patterns from the ordered list 220 to bring the number of search patterns in the ordered list 220 down to a threshold number as defined in threshold number data 230 or can combine multiple search patterns from the ordered list 220 together, as described below in accordance with FIG. 4 and FIG. 5, respectively.

Figure 4:
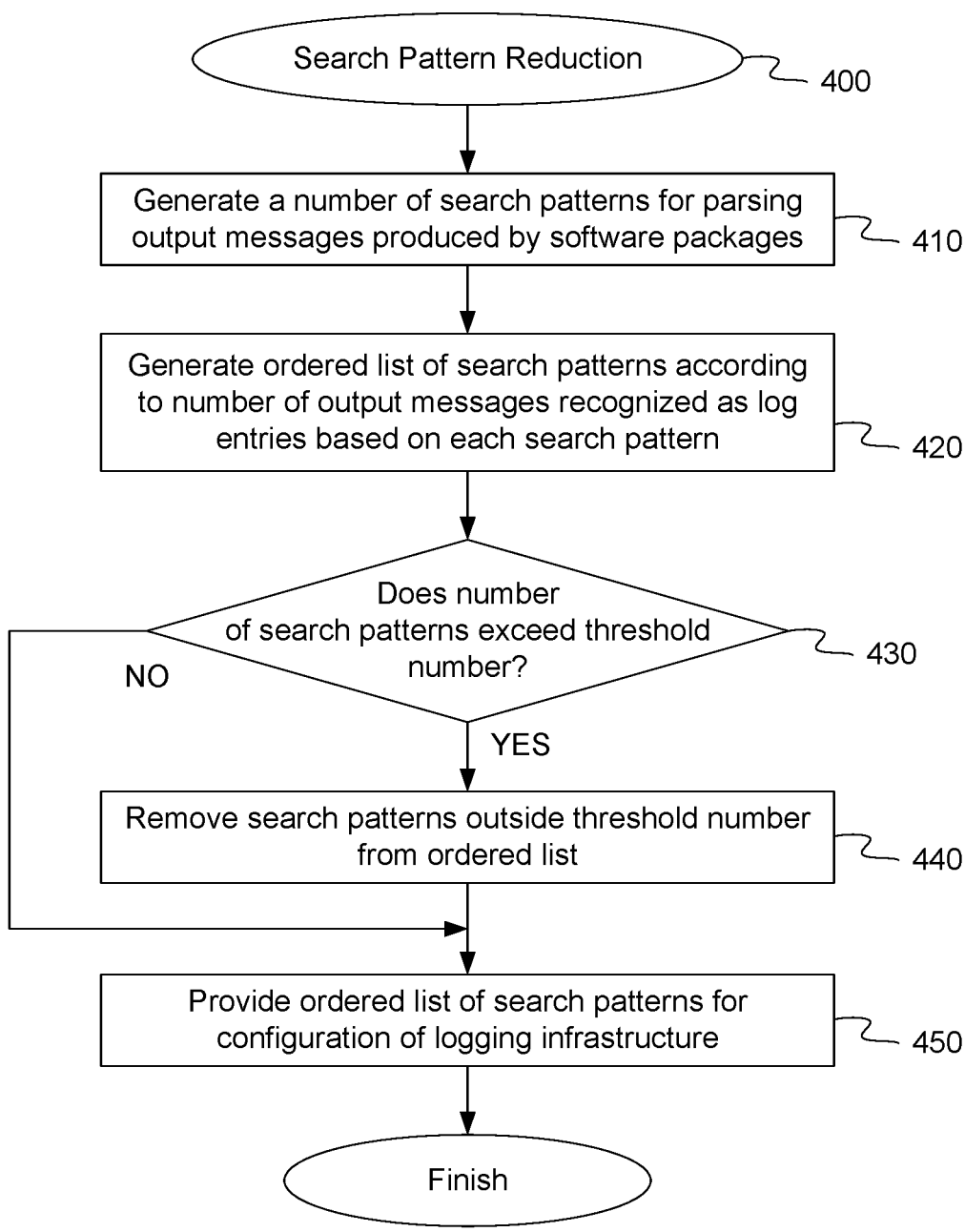
FIG. 4 is a flow diagram illustrating a method of reducing a number of search patterns to be applied to output messages of a software package to identify log entries among the output messages, according to an embodiment.

FIG. 4 is a flow diagram illustrating a method of reducing a number of search patterns to be applied to output messages of a software package to identify log entries among the output messages, according to an embodiment. The method 400 may be performed by processing logic that comprises hardware (e.g., circuitry, dedicated logic, programmable logic, microcode, etc.), software (e.g., instructions run on a processor to perform hardware simulation), or a combination thereof. In one embodiment, method 400 may be performed by search pattern generator 140, as shown in FIGS. 1 and 2.

Referring to FIG. 4, at block 410, method 400 generates a number of search patterns for parsing output messages produced by the one or more software packages, as described above with respect to FIG. 3.

At block 420, method 400 generates an ordered list of the search patterns according to a number of output messages that were recognized as log entries based on each search pattern. In one embodiment, search pattern module 244 can maintain a mapping of the various constructed search patterns to the number of output messages recognized as log entries by each constructed search pattern over time. As additional output messages are recognized as log entries based on a given search pattern, search pattern module 244 increments a corresponding counter for that search pattern. Thus, the ordered list 220 can be configured such that the search patterns having the highest number of historical recognized occurrences are positioned at the beginning of the ordered list 220 and the search patterns having the lowest number of historical matches are positions at the end of the ordered list 220.

At block 430, method 400 determines whether a number of search patterns in the ordered list 220 exceeds a threshold number defined by threshold number data 230. In one embodiment, reducer module 246 determines a number of search patterns in the ordered list 220 and compares the number of search patterns to a threshold number specified in threshold number data 230.

If the number of search patterns in the ordered list 220 exceeds the threshold number, at block 440, method 400 removes search patterns outside the threshold number from the ordered list 220. Since the search patterns are arranged in an order according to a number of output messages recognized by each search pattern, the search patterns among the threshold number will necessarily have a higher number of recognized output messages than the search pattern outside the threshold number. Thus, those search patterns outside the threshold number that are removed will be those having the lowest number of recognized output messages from the ordered list 220.

At block 450, method 400 provides the ordered list of search patterns, either as generated at block 420 or as reduced at block 440, for configuration of logging infrastructure 100. In one embodiment, the ordered list of search patterns 220 (whether reduced or not) can be used to configure log entry component 160 to apply those search patterns to the output messages produced by the one or more software packages to identify log entries among the output messages generated by those software packages and optionally modify the identified log entries to conform to the predefined uniform format.

Figure 5:
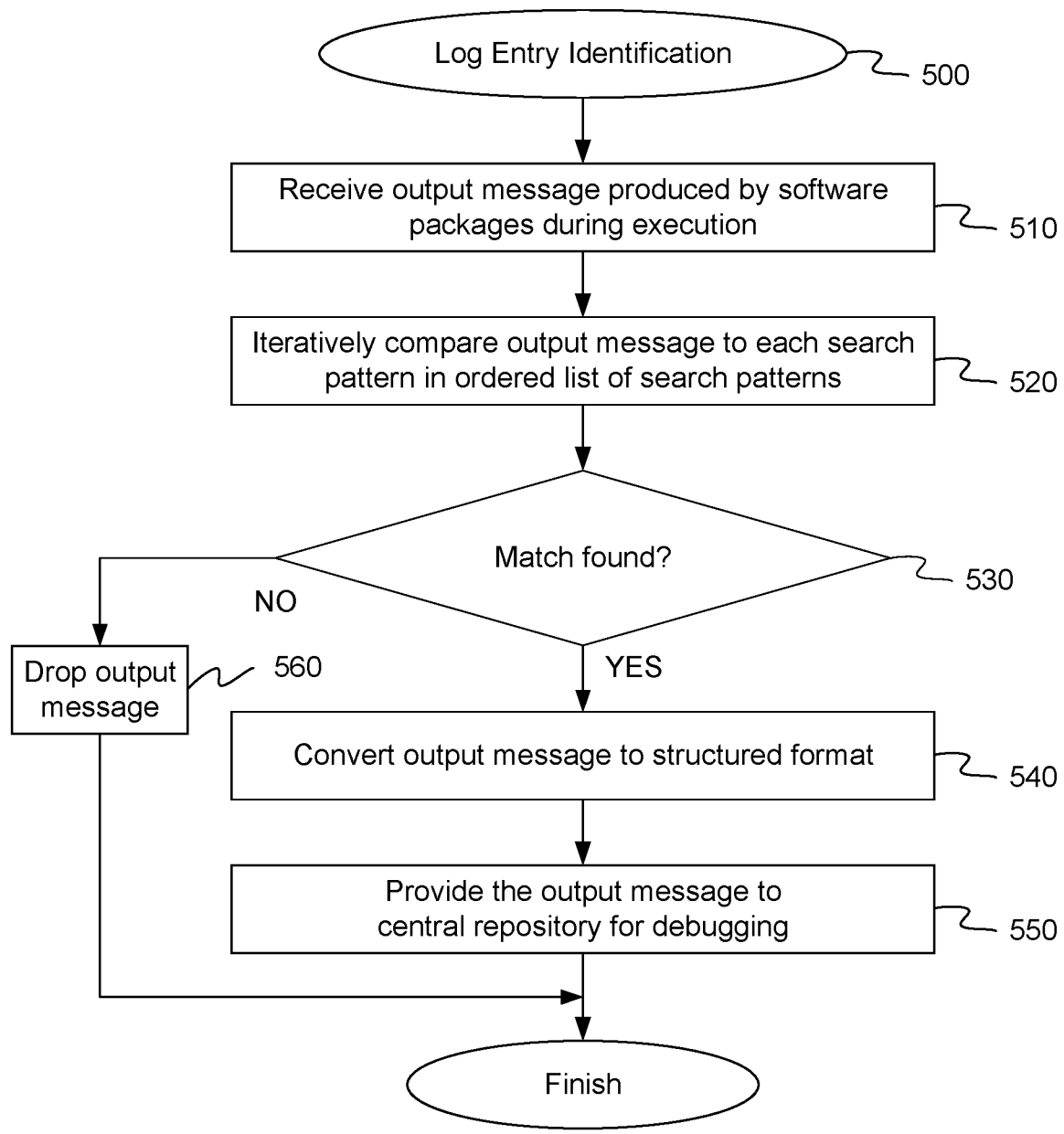
FIG. 5 is a flow diagram illustrating a method of identifying log entries among the output messages of a software package using search patterns generated from the source code of the software package, according to an embodiment.

FIG. 5 is a flow diagram illustrating a method of identifying log entries among the output messages of a software package using search patterns generated from the source code of the software package, according to an embodiment. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by log entry component 160, as shown in FIG. 1.

Referring to FIG. 5, at block 510, method 500 receives an output message produced by the one or more software packages during execution. For example, software package 122 may be represented by source code including instructions which can be executed by a processing device to perform designated functions or tasks. As part of its operation, software package 122 may generate a number of output messages in response to certain call expressions defined in the corresponding source code. During execution, the software package 122 may periodically output log entries, such as in response to the occurrence of particular actions or events. The parameters and other information contained within the log entries may be useful to developers when debugging the software package 122 at a later point in time. The entries may be output as output messages by the software package 122, potentially along with other output messages that do not include logging calls.

At block 520, method 500 iteratively compares the output message to each search pattern in an ordered list 220 of the number of search patterns, wherein the ordered list 220 is arranged based on how often each search pattern has a matching output message. When evaluating the output messages of a software deployment, log entry component 160 may compare a given output message against each of the configured search patterns in the ordered list 220 until a match is found. Thus, it is advantageous to have the search patterns most likely to match a log entry be positioned at the beginning of the ordered list 220. At block 530, method 500 determines whether a match is found. In one embodiment, log entry component determines that a match is found when the output message matches one of the search patterns.

If a match is found, at block 540, method 500 converts the output message to a predefined structured format. The predefined structured format of these log entries allows for more complex aggregation queries to be executed on specific fields of the log entry, thereby improving debugging capabilities. In one embodiment, log entry component generates a structured log entry including a static portion and variable parameter values included separately.

At block 550, method 500 provides the message to a central repository for debugging. Log destination and debugging platform 130 may represent a central destination where logging infrastructure 100 can consolidate log, telemetry, and metric information from multiple distributed software deployments, such as those including software packages 112 and 122. Having the logging data consolidated to a single destination allows developers to more efficiently debug or otherwise investigate issues occurring during the execution of software packages 112 and 122 by eliminating other variables that may be attributable to the corresponding software deployments 110 and 120. If no match is found at block 530, at block 560, method 500 drops the output message without sending the message to the log destination and debugging platform.

Figure 6:
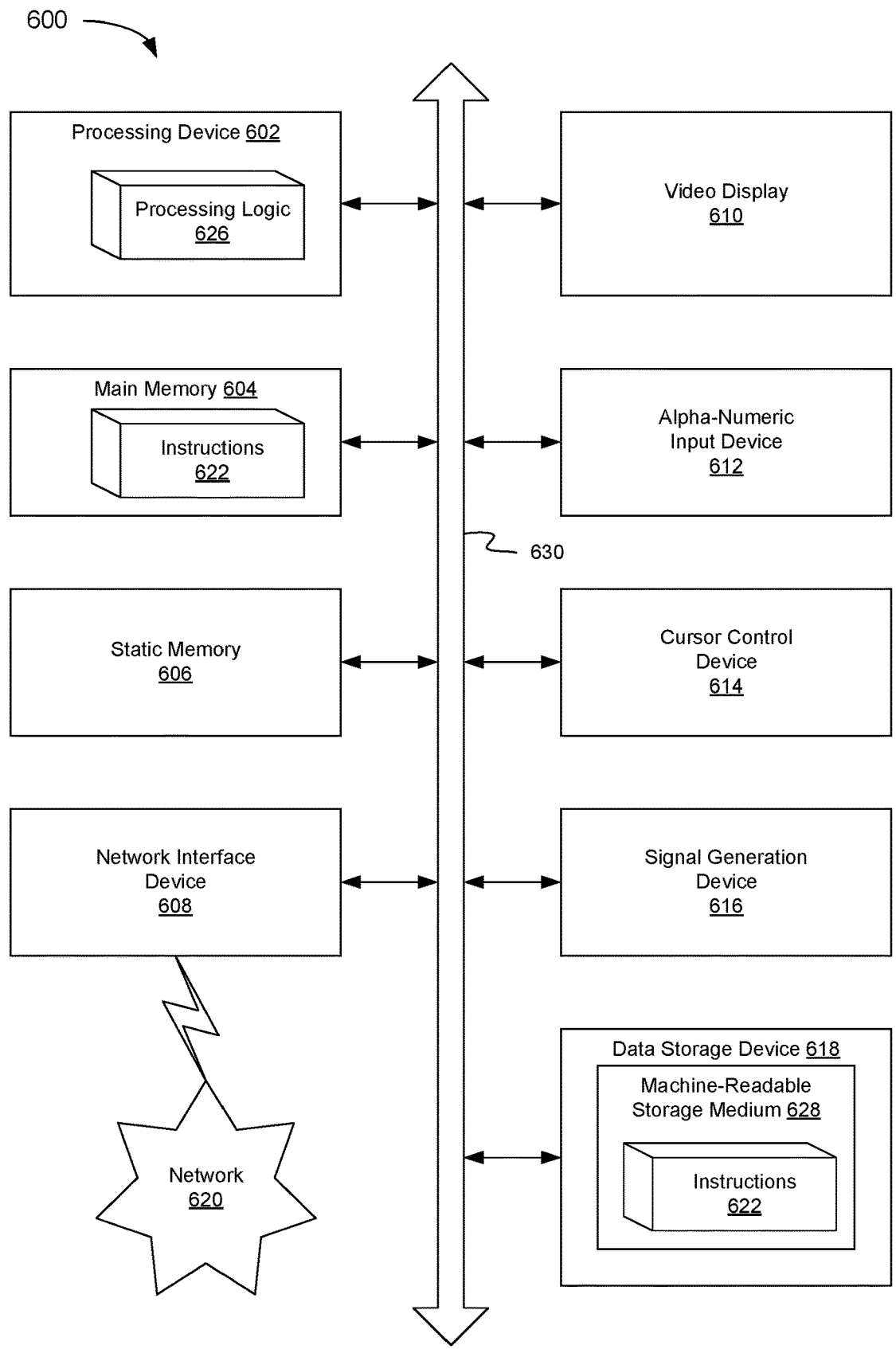
FIG. 6 is a block diagram illustrating a computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a computing device, such as one executing any of software deployments 110 and 120, log destination and debugging platform 130, and/or search pattern generator 140.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608.

The machine-readable storage medium 628 may also be used to store instructions 622 for automatic configuration of logging infrastructure for software deployments using source code, as performed by search pattern generator 140 and/or log entry component 160, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   generating a number of search patterns for parsing output messages produced by one or more software packages, wherein each of the search patterns is based on one or more arguments of a corresponding call expression in source code of the one or more software packages;
   generating an ordered list of the search patterns according to a number of output messages recognized as log entries based on each search pattern;
   identifying a threshold number of the search patterns, wherein the search patterns among the threshold number have a higher number of output messages recognized as log entries than the search patterns outside the threshold number; and
   removing the search patterns outside the threshold number from the ordered list.

2. The method of claim 1, further comprising:
   identifying, in the source code, one or more call expressions that each represent a logging call.

3. The method of claim 2, wherein identifying the one or more call expressions comprises traversing one or more abstract syntax trees for the one or more software packages.

4. The method of claim 1, wherein generating the number of search patterns comprises applying string parsing logic to a string representing the corresponding call expression, the string parsing logic to identify a function call and one or more parameters in the one or more arguments of the corresponding call expression.

5. The method of claim 1, wherein the search patterns comprise regular expressions.

6. The method of claim 1, wherein a log entry component that applies the search patterns to the output messages produced by the one or more software packages is configured to:
   receive an output message produced by the one or more software packages during execution; and
   iteratively compare the output message to each search pattern in an ordered list of the number of search patterns until a match is found, wherein the ordered list is arranged based on how often each search pattern has a matching output message.

7. The method of claim 6, wherein the log entry component is further configured to:
   convert the output message to a structured format; and
   provide the message to a central repository.

8. A system comprising:
   memory; and
   one or more processors coupled to the memory, the one or more processors to:
   generate a number of search patterns for parsing output messages produced by one or more software packages, wherein each of the search patterns is based on one or more arguments of a corresponding call expression in source code of the one or more software packages;
   generate an ordered list of the search patterns according to a number of output messages recognized as log entries based on each search pattern;
   identify a threshold number of the search patterns, wherein the search patterns among the threshold number have a higher number of output messages recognized as log entries than the search patterns outside the threshold number; and
   remove the search patterns outside the threshold number from the ordered list.

9. The system of claim 8, wherein the one or more processors are further to:
   identify, in the source code, one or more call expressions that each represent a logging call.

10. The system of claim 9, wherein to identify the one or more call expressions, the one or more processors are to traverse one or more abstract syntax trees for the one or more software packages.

11. The system of claim 8, wherein to generate the number of search patterns, the one or more processors are to apply string parsing logic to a string representing the corresponding call expression, the string parsing logic to identify a function call and one or more parameters in the one or more arguments of the corresponding call expression.

12. The system of claim 8, wherein the search patterns comprise regular expressions.

13. The system of claim 8, wherein a log entry component that applies the search patterns to the output messages produced by the one or more software packages is configured to:
   receive an output message produced by the one or more software packages during execution; and
   iteratively compare the output message to each search pattern in an ordered list of the number of search patterns until a match is found, wherein the ordered list is arranged based on how often each search pattern has a matching output message.

14. The system of claim 13, wherein the log entry component is further configured to:
   convert the output message to a structured format; and
   provide the message to a central repository.

15. A non-transitory computer readable storage medium storing instructions that, when executed by one or more processors, cause the one or more processors to:
   generate a number of search patterns for parsing output messages produced by one or more software packages, wherein each of the search patterns is based on one or more arguments of a corresponding call expression in source code of the one or more software packages;
   generate an ordered list of the search patterns according to a number of output messages recognized as log entries based on each search pattern;
   identify a threshold number of the search patterns, wherein the search patterns among the threshold number have a higher number of output messages recognized as log entries than the search patterns outside the threshold number; and
   remove the search patterns outside the threshold number from the ordered list.

16. The non-transitory computer readable storage medium of claim 15, wherein the instructions further cause the one or more processors to:
   identify, in the source code, one or more call expressions that each represent a logging call.

17. The non-transitory computer readable storage medium of claim 16, wherein to identify the one or more call expressions, the instructions cause the one or more processors to traverse one or more abstract syntax trees for the one or more software packages.

18. The non-transitory computer readable storage medium of claim 15, wherein to generate the number of search patterns, the instructions cause the one or more processors to apply string parsing logic to a string representing the corresponding call expression, the string parsing logic to identify a function call and one or more parameters in the one or more arguments of the corresponding call expression.

19. The non-transitory computer readable storage medium of claim 15, wherein the search patterns comprise regular expressions.

20. The non-transitory computer readable storage medium of claim 15, wherein a log entry component that applies the search patterns to the output messages produced by the one or more software packages is configured to:
- receive an output message produced by the one or more software packages during execution;
- iteratively compare the output message to each search pattern in an ordered list of the number of search patterns until a match is found, wherein the ordered list is arranged based on how often each search pattern has a matching output message;
- convert the output message to a structured format; and
- provide the message to a central repository.

* * * * *